United States Patent
Törmä et al.

(10) Patent No.: US 12,147,375 B2
(45) Date of Patent: Nov. 19, 2024

(54) USB CONTROLLER ENDPOINT RESOURCE MANAGEMENT

(71) Applicant: BLANCCO TECHNOLOGY GROUP IP OY, Joensuu (FI)

(72) Inventors: Markus Törmä, Joensuu (FI); Jarno Manninen, Joensuu (FI); Niko Häikiö, Joensuu (FI)

(73) Assignee: BLANCCO TECHNOLOGY GROUP IP OY (FI)

( * ) Notice: Subject to any disclaimer, the term of this patent is extended or adjusted under 35 U.S.C. 154(b) by 68 days.

(21) Appl. No.: 17/795,817

(22) PCT Filed: Jan. 28, 2021

(86) PCT No.: PCT/EP2021/051926
§ 371 (c)(1),
(2) Date: Jul. 27, 2022

(87) PCT Pub. No.: WO2021/156127
PCT Pub. Date: Aug. 12, 2021

(65) Prior Publication Data
US 2023/0089104 A1  Mar. 23, 2023

(30) Foreign Application Priority Data

Feb. 7, 2020 (GB) ..................... 2001700

(51) Int. Cl.
*G06F 13/42* (2006.01)
*G06F 13/38* (2006.01)
(52) U.S. Cl.
CPC ........ *G06F 13/4282* (2013.01); *G06F 13/382* (2013.01); *G06F 2213/0042* (2013.01)
(58) Field of Classification Search
CPC .................................................. G06F 13/385
See application file for complete search history.

(56) References Cited

U.S. PATENT DOCUMENTS

| 6,122,676 | A | 9/2000 | Brief et al. |
| 8,843,664 | B2 * | 9/2014 | Bajpai ................. G06F 11/3051 710/10 |

(Continued)

OTHER PUBLICATIONS

Notification of Transmittal of the International Search Report and the Written Opinion of the International Searching Authority, or the Declaration, dated Apr. 9, 2021 (Sep. 4, 2021), issued on related international patent application PCT/EP2021/051926 by the European Patent Office / International Searching Authority.

(Continued)

*Primary Examiner* — Steven G Snyder
*Assistant Examiner* — Juanito C Borromeo
(74) *Attorney, Agent, or Firm* — DICKINSON WRIGHT PLLC (57) ABSTRACT

A method for performing an operation in relation to a USB device, comprises configuring a USB interface in a USB controller so as to open one or more pipes between the USB controller and one or more corresponding USB endpoints of a USB device according to a required USB endpoint configuration of the USB device that is required for performing an operation in relation to the USB device, performing the operation in relation to the USB device, and unconfiguring the configured USB interface in the USB controller so as to close the one or more pipes between the USB controller and the one or more corresponding USB endpoints of the USB device. Such a method may allow operations to be performed concurrently in relation to a greater number of USB devices than the prior art methods and/or may allow operations to be performed concurrently in relation to the same number of USB devices using fewer USB endpoint resources of the USB controller and/or fewer USB controllers than the prior art methods.

20 Claims, 5 Drawing Sheets

(56) References Cited

U.S. PATENT DOCUMENTS

| | | |
|---|---|---|
| 10,873,525 B2* | 12/2020 | Berchanskiy ............ H04L 45/24 |
| 2004/0133708 A1 | 7/2004 | Augustin et al. |
| 2011/0072184 A1* | 3/2011 | Tateyama .............. G06F 13/385 |
| | | 710/308 |
| 2013/0219095 A1 | 8/2013 | Kondo |
| 2017/0228334 A1 | 8/2017 | Albert et al. |

OTHER PUBLICATIONS

Search Report under Section 17, dated Jul. 14, 2020 (Jul. 14, 2020), issued on related Great Britain patent application GB2001700.2 by the Intellectual Property Office of the United Kingdom.

* cited by examiner

USB CONTROLLER ENDPOINT RESOURCE MANAGEMENT

CROSS REFERENCE TO RELATED APPLICATIONS

This application is a U.S. National Phase patent application of and claims priority to PCT/EP2021/051926, filed Jan. 28, 2021, which claims priority to and the benefit of United Kingdom Patent Application 2001700.0 filed Feb. 7, 2020, each of the foregoing applications being incorporated herein by reference.

FIELD

The present disclosure relates to a method and apparatus for performing an operation in relation to a USB device via a USB controller and, in particular though not exclusively, for performing a diagnostic and/or erasure operation in relation to a USB device via a USB controller.

BACKGROUND

The latest generation of USB 3.0 controllers are known to have a limitation that arises from the limited number of resources within a USB 3.0 controller. For example, according to, Intel eXtensible Host Controller Interface for Universal Serial Bus (xHCI) specification (Rev. 1.2, May 2019), "The xHC maintains a global Resources Available variable, which is initialized to indicate all xHC resources are available. A Resource is an xHC implementation defined metric, which refers to the internal xHC data structures, buffer space, or other implementation specific resources required to support endpoint type." USB endpoints are one such resource that may be the limiting factor in relation to how many USB devices (or USB interfaces) a single USB controller is able to manage concurrently.

For example, when a USB device is connected to a host machine or computing resource such as a personal computer (PC) via a USB controller, it is conventional for an operating system (OS) of the host machine to configure a USB interface in the USB controller automatically so as to open a number of pipes, each pipe defining a corresponding data channel between the USB controller and a different endpoint of the USB device. Here "USB interface" corresponds to the USB controller operation of a USB function interface in accordance with Universal Serial Bus Specification (Rev. 2.0, Apr. 27, 2000). For example, connecting a USB flash drive to the host machine may result in the OS of the host machine configuring a USB interface in the USB controller so as to open a group of three to four pipes, whereas connecting headsets and other sensors to the host machine may result in the OS of the host machine configuring a USB interface in the USB controller so as to open a group of 10 pipes.

When a USB device is connected to a host machine via a USB controller, different functionalities and/or interfaces of the USB device may require the OS of the host machine to configure different USB interfaces in the USB controller so as to open different groups of one or more pipes between the USB controller and the USB device by default thereby reserving a corresponding number of endpoint resources of the USB controller by default for communication with the USB device. For example, a USB mouse and a USB keyboard, and one or more mass storage functions of a USB device may each require the OS of the host machine to configure different USB interfaces in the USB controller so as to open one or more pipes between the USB controller and the USB device by default, thereby reserving a corresponding number of endpoint resources of the USB controller by default for communication with the USB device. For example, ADB (Android Debug Bridge) requires the OS of the host machine to configure a USB interface in the USB controller so as to open two pipes by default; serial communication requires the OS of the host machine to configure a USB interface in the USB controller so as to open one, two or three pipes by default; and MTP/PTP protocols require the OS of the host machine to configure a USB interface in the USB controller so as to open three pipes by default (one pipe to the USB device, one pipe from the USB device, and one pipe from the USB controller to an exception endpoint of the USB device).

It is also known to perform diagnostic and/or erasure operations in relation to several USB devices such as several mobile USB devices at the same time by connecting the mobile USB devices to a host machine via a single USB controller routed to a USB hub and executing dedicated software in the form of an application running on the OS of the host machine to perform the diagnostic and/or erasure operations. The application may require different USB interfaces to be configured in the USB controller (and therefore a number of pipes to be opened and a corresponding number of endpoint resources of the USB controller to be reserved) depending on the interfaces associated with the mobile USB devices. For example, the application may require one or more of: a MTP/PTP interface; a ADB (Android Debug Bridge); one or more Apple-specific interfaces; and a serial interface to be configured. For example, a single Android device may require up to 16 pipes to be opened and a corresponding number of endpoint resources of the USB controller to be reserved.

Currently, the USB interfaces to be configured in the USB controller are determined when the mobile USB device and the host machine are connected via the USB controller. When the mobile USB device is connected to the host machine and enumerated, the OS of the host machine configures the USB interfaces in the USB controller so as to open all of the pipes between the USB controller and the corresponding USB endpoints of the mobile USB device required for all possible interfaces of the mobile USB device by default, thereby automatically reserving a corresponding number of endpoint resources of the USB controller until the mobile USB device is disconnected from the host machine. At the time of connection of the mobile USB device to the host machine, the operation to be performed is not known, so the OS of the host machine may configure an excessive number of USB interfaces, thereby automatically reserving an excessive number of the limited endpoint resources of the USB controller until the mobile USB device is disconnected from the host machine.

Once all of the endpoint resources of the USB controller have been reserved, the host machine is prevented from communicating with any further mobile USB devices via the same USB controller, thereby preventing any operations from being performed in relation to any further mobile USB devices connected via the same USB controller. Thus, the limitation of the hardware of known USB controllers and the wasteful endpoint USB controller resource allocation strategies of known host machine operating systems limits the number of mobile USB devices that a host machine can process concurrently via a known USB controller. A known solution to this problem is to use additional USB extension cards or modules in the host machine, each extension card including one or more additional USB controllers. For example, it is known to add USB extension cards to the PCI Express bus of the host machine, wherein each extension card comprises at least one additional USB controller.

Furthermore, if the interfaces of a mobile USB device required for performing a desired operation are not enabled when a connection between the mobile USB device and the host machine is established via the USB controller, the connection has to be disconnected and re-established with the required interface of the mobile USB device enabled. As an example, when an Android mobile USB device is connected to a host machine via a USB controller, ADB is first disabled (not shown in the mobile USB device descriptor) by default and it is only possible to identify the mobile USB device by other means, for example over a serial connection (e.g. by receiving the mobile USB device model and IMEI code). Currently, ADB needs to be enabled by a user before diagnostics tests are run, while also leaving the serial connection enabled. This may also result in the limited endpoint resources of the USB controller being reserved until the mobile USB device is disconnected from the host machine.

Figure 1:
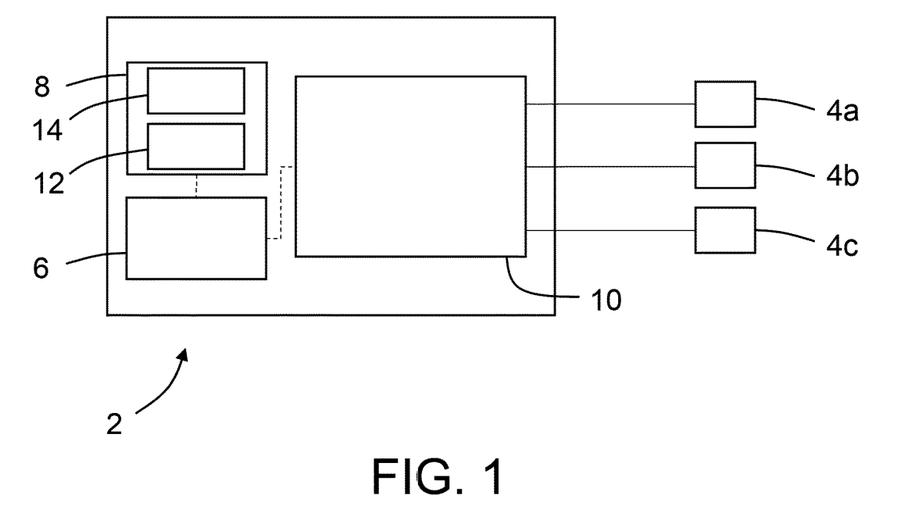
FIG. 1 schematically illustrates a plurality of USB devices connected to a prior art apparatus for performing an operation in relation to the plurality of USB devices.

More specifically, referring to FIG. 1 there is shown a known host machine in the form of a computing resource such as a PC 2 for performing a diagnostic and/or erasure operation in relation to a plurality of mobile USB devices 4a, 4b and 4c. Each mobile USB device 4a, 4b, 4c may, for example, comprise a mobile device such as a mobile phone, a cell phone, a smart phone, a tablet, a laptop or the like. The PC 2 includes a processor 6, a memory 8 and a USB controller 10. As indicated by the dashed lines, the processor 6 is configured for communication with the memory 8 and the USB controller 10. The memory 8 stores an OS 12 of the PC 2 and dedicated software in the form of a diagnostic and/or erasure application 14 which is configured to run on top of the OS 12 of the PC 2.

Figure 2:
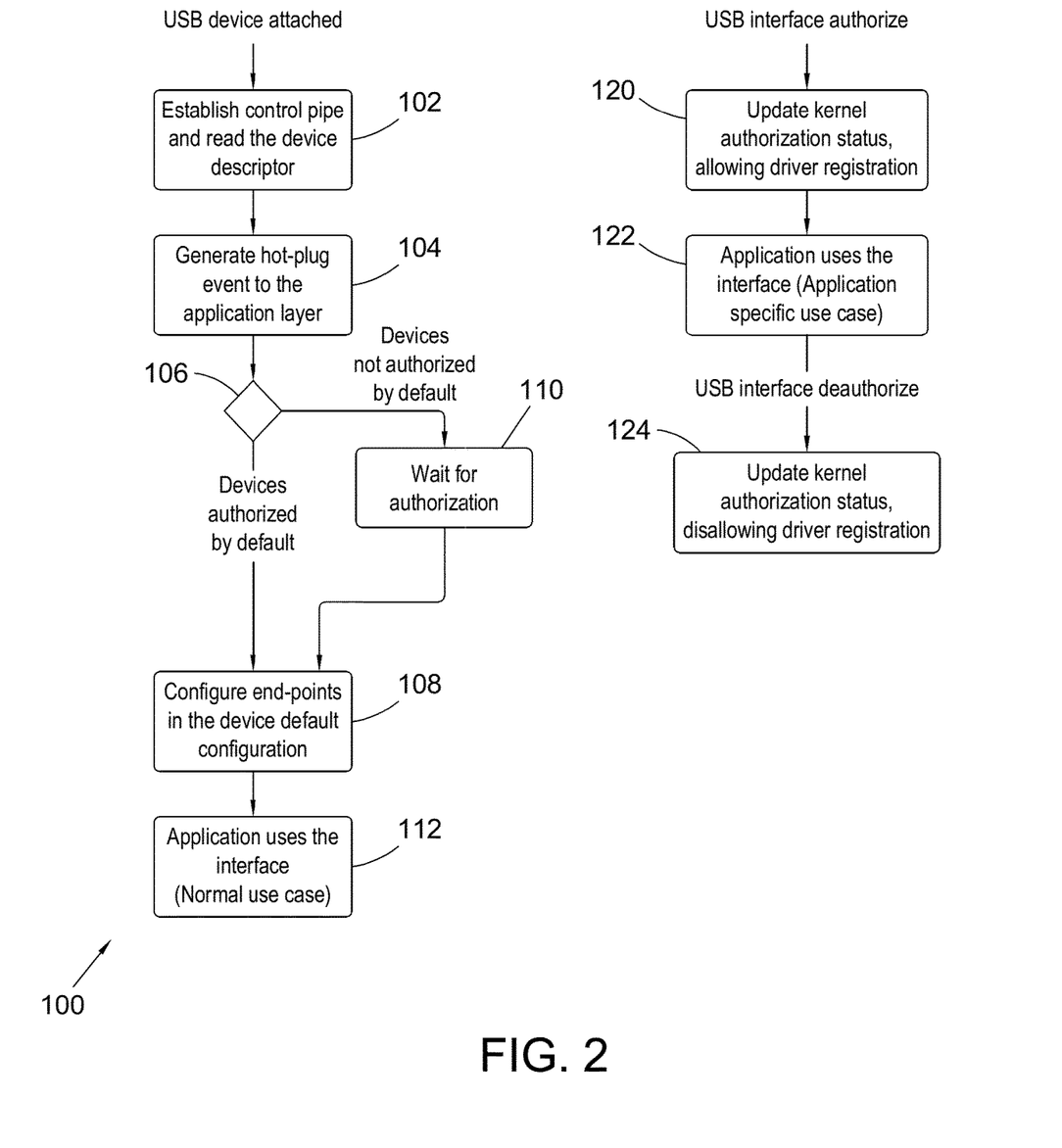
FIG. 2 schematically illustrates a prior art method for performing an operation in relation to a USB device in the context of the handling flow of an OS of a computing resource of the prior art apparatus of FIG. 1.

Referring now to FIG. 2, there is shown a prior art method 100 for use in performing a diagnostic and/or erasure operation in relation to one of the mobile USB devices 4a, 4b, 4c. The method 100 begins in response to the connection of one of the mobile USB devices 4a, 4b and 4c to the host computing resource such as a PC 2 via the USB controller 10. At step 102, the OS 12 of the PC 2 causes the USB controller 10 to establish a control pipe between the USB controller 10 and the mobile USB device 4a, 4b, 4c. At step 104, the OS 12 of the PC 2 generates a hot plug event to the diagnostic and/or erasure application 14. At step 106, the OS 12 of the PC 2 then checks whether or not a setting of "authorized by default" is set to "true". If the setting of "authorized by default" is set to "true", the OS 12 of the PC 2 configures a USB interface in the USB controller 10 at step 108 so as to open all of the pipes between the USB controller 10 and the corresponding endpoints of the mobile USB device 4a, 4b, 4c according to a default endpoint configuration for the mobile USB device 4a, 4b, 4c. If the setting of "authorized by default" is not set to "true", the OS 12 of the PC 2 waits at step 110 until an authorization is given by the diagnostic and/or erasure application 14 through some other authorization mechanism before proceeding to step 108. At step 112, the diagnostic and/or erasure application 14 then performs the desired diagnostic and/or erasure operation in relation to the mobile USB device 4a, 4b, 4c via the configured interface of the USB controller 10.

Furthermore, the OS 12 of the PC 2 checks whether or not a setting of "USB interface authorized" is set to "true" and if the "USB interface authorized" setting is set to "true", the OS 12 of the PC 2 updates a kernel authorization status at step 120 thereby allowing the diagnostic and/or erasure application 14 to register and use one or more drivers of the USB controller 10 so that the diagnostic and/or erasure application 14 can perform the desired diagnostic and/or erasure operation in relation to the mobile USB device 4a, 4b, 4c via the configured USB interface of the USB controller 10 at step 122. The OS 12 of the PC 2 then updates the "USB interface authorized" setting by updating the kernel authorization status thereby allowing the diagnostic and/or erasure application 14 to unregister the one or more drivers for the USB controller 10 at step 124. If the "USB interface authorized" setting is not set to "true", the diagnostic and/or erasure application 14 is not permitted to perform the desired diagnostic and/or erasure operation in relation to the mobile USB device 4a, 4b, 4c via the configured USB interface of the USB controller 10 at step 122.

SUMMARY

According to an aspect of the present disclosure there is provided a method for performing an operation in relation to a USB device, the method comprising:
  configuring a USB interface in a USB controller so as to open one or more pipes between the USB controller and one or more corresponding USB endpoints of a USB device according to a required USB endpoint configuration of the USB device that is required for performing an operation in relation to the USB device;
  performing the operation in relation to the USB device; and
  unconfiguring the configured USB interface in the USB controller so as to close the one or more pipes between the USB controller and the one or more corresponding USB endpoints of the USB device.

Configuring the USB interface in the USB controller so as to open one or more pipes between the USB controller and one or more corresponding USB endpoints of the USB device according to the required USB endpoint configuration of the USB device that is required for performing a specific operation in relation to the USB device, may reduce the number of USB endpoint resources of the USB controller that are reserved in order to perform the operation in relation to the USB device compared with prior art methods which automatically configure a USB interface in a USB controller so as to open a sufficient number of pipes between the USB controller and the corresponding USB endpoints of the USB device required for all possible interfaces of the USB device. Accordingly, such a method may allow operations to be performed concurrently in relation to a greater number of USB devices than the prior art methods and/or may allow operations to be performed concurrently in relation to the same number of USB devices using fewer USB endpoint resources of the USB controller and/or fewer USB controllers than the prior art methods.

Unconfiguring the USB interface in the USB controller so as to close the one or more pipes between the USB controller and the one or more corresponding USB endpoints of the USB device after the operation has been performed, minimizes the time that the USB endpoint resources of the USB controller are reserved in order to perform the operation in relation to the USB device, thereby potentially allowing operations to be performed concurrently in relation to a greater number of USB devices than the prior art methods and/or potentially allowing operations to be performed concurrently in relation to the same number of USB devices using fewer USB endpoint resources of the USB controller and/or fewer USB controllers than the prior art methods.

The method may comprise configuring the USB interface in the USB controller so as to open one or more pipes between the USB controller and the USB device in response to communication between the USB device and the USB controller.

The method may comprise configuring the USB interface in the USB controller so as to open one or more pipes between the USB controller and the USB device in response to detecting the attachment or connection of the USB device to the USB controller.

The method may comprise receiving information relating to the USB device and/or receiving information relating to the operation to be performed in relation to the USB device.

The method may comprise determining the required endpoint configuration of the USB device based at least in part on the received information relating to the USB device and/or the received information relating to the operation to be performed in relation to the USB device.

The required endpoint configuration of the USB device may comprise the minimum number of USB endpoints of the USB device required to perform the operation in relation to the USB device.

The method may comprise determining the minimum number of USB endpoints of the USB device required to perform the operation in relation to the USB device based at least in part on the received information relating to the USB device and/or the received information relating to the operation to be performed in relation to the USB device.

The USB controller may be configured for communication with a computing resource such as a personal computer or the like. The USB controller may be connected to the computing resource. The computing resource may serve as a host machine for the USB controller.

The computing resource may comprise a processing resource and a memory.

The memory may comprise volatile memory, such as the random-access memory (RAM). The memory may comprise non-volatile memory, such as a hard disk drive (HDD) or a solid-state drive (SSD). The memory may comprise one or more removable media, such as one or more USB flash drives.

The memory may store an operating system (OS) of the computing resource.

The memory may store a computer program.

The computer program may comprise dedicated software or an application.

The computer program may be configured to run on top of the OS.

When executed by the processing resource, the computer program may cause the processing resource to perform any of the foregoing methods.

When executed by the processing resource, the computer program may cause the processing resource to modify or over-ride the default USB endpoint configuration functionality of the OS and configure the USB interface in the USB controller so as to open one or more pipes between the USB controller and one or more corresponding USB endpoints of the USB device according to the required USB endpoint configuration of the USB device that is required for performing an operation in relation to the USB device.

When executed by the processing resource, the computer program may cause the processing resource to modify or over-ride the default USB endpoint unconfiguration functionality of the OS and to unconfigure the configured USB interface in the USB controller so as to close the one or more pipes between the USB controller and the one or more corresponding USB endpoints of the USB device.

The OS of the computing resource may comprise a Linux OS.

The method may comprise modifying or over-riding the default USB endpoint configuration functionality and/or the default USB endpoint unconfiguration functionality defined by at least a portion of a kernel of the Linux OS of the computing resource. The method may comprise selecting appropriate parameters of the OS so as to modify or over-ride the default USB endpoint configuration functionality and/or the default USB endpoint unconfiguration functionality of the OS.

The method may comprise:
  reading, from the USB device, a USB device descriptor; and
  using the USB device descriptor to select the information relating to the USB device and/or the information relating to the operation to be performed in relation to the USB device from accumulated information relating to a plurality of known USB devices stored in the memory of the computing resource or from a database.

The database may be located remotely from the computing resource.

The computing resource may comprise a user interface.

When executed by the processing resource, the computer program may cause the processing resource to request from a user, information relating to the USB device and/or information relating to the operation to be performed in relation to the USB device via the user interface.

When executed by the processing resource, the computer program may cause the processing resource to control the user interface so as to display a request for input of information relating to the USB device and/or information relating to the operation to be performed in relation to the USB device.

When executed by the processing resource, the computer program may cause the processing resource to modify and/or over-ride the default USB endpoint configuration functionality of the OS and/or the default USB endpoint unconfiguration functionality of the OS in response to the information relating to the USB device and/or the information relating to the operation to be performed in relation to the USB device.

Performing the operation in relation to the USB device may comprise performing the operation to the USB device or causing the operation to be performed to, or by, the USB device.

The operation may comprise an erasure operation.

Performing the erasure operation may comprise over-writing data stored in a memory of the USB device.

Performing the erasure operation may comprise causing the USB device to execute an erasure operation defined by the USB device.

The operation may comprise a diagnostic operation.

Performing the diagnostic operation may comprise performing the diagnostic operation to the USB device.

Performing the diagnostic operation may comprise causing the USB device to execute a diagnostic operation defined by the USB device.

The method may comprise:
  configuring one or more USB interfaces in a USB controller so as to open one or more pipes between the USB controller and one or more corresponding USB endpoints of a plurality of USB devices according to a corresponding plurality of required USB endpoint configurations of the plurality of USB devices, wherein the required USB endpoint configuration of any given USB device is the USB endpoint configuration required for performing a corresponding operation in relation to the given USB device;

performing the corresponding operation in relation to each one of the plurality of USB devices; and unconfiguring the one or more configured USB interfaces in the USB controller so as to close the one or more pipes between the USB controller and the one or more corresponding USB endpoints of the plurality of USB devices.

Each USB device may comprise a mobile USB device such as a mobile phone, a cell phone, a smart phone, a tablet, a laptop or the like.

According to an aspect of the present disclosure there is provided an apparatus for performing an operation in relation to a USB device, the apparatus comprising:

a USB controller; and a computing resource configured for communication with the USB controller, wherein the computing resource comprises a processing resource and a memory, the memory storing an operating system and a computer program, wherein the OS defines a default USB endpoint configuration functionality, and wherein, when executed by the processing resource, the computer program causes the processing resource to modify or over-ride the default USB endpoint configuration functionality of the OS and thereby cause the processing resource to perform any of the methods described above.

Each USB device may comprise a mobile USB device such as a mobile phone, a cell phone, a smart phone, a tablet, a laptop or the like.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

One or more apparatus and methods for performing an operation in relation to a USB device will now be described by way of non-limiting example only with reference to the accompanying drawings of which.

DETAILED DESCRIPTION OF THE DRAWINGS

Figure 3:
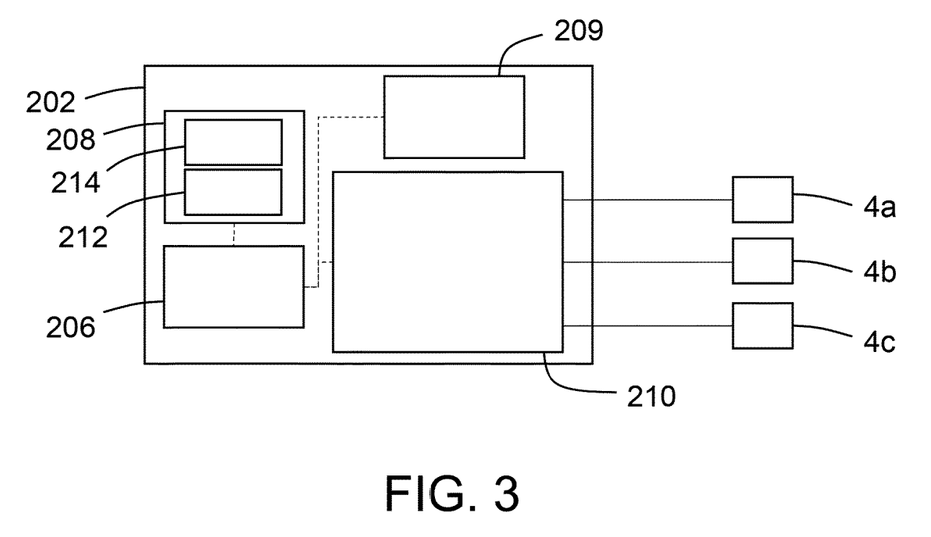
FIG. 3 schematically illustrates a plurality of USB devices connected to an apparatus for performing an operation in relation to the plurality of USB devices.

Referring to FIG. 3 there is shown a computing resource in the form of a PC 202 for performing a diagnostic and/or erasure operation in relation to the plurality of mobile USB devices 4a, 4b and 4c. The PC 202 includes a processing resource 206, a memory 208 and a user interface 209. The PC 202 serves as a host for a USB controller 210. As indicated by the dashed lines, the processing resource 206 is configured for communication with the memory 208, the user interface 209, and the USB controller 210. The memory 208 stores an OS 212 of the PC 202 and dedicated software in the form of a diagnostic and/or erasure application 214 which is configured to run on top of the OS 212.

The diagnostic and/or erasure application 214 defines a method 300 for use in performing a diagnostic and/or erasure operation in relation to one of the mobile USB devices 4a, 4b, 4c which will now be described with reference to FIG. 4. When running on the OS 212 and executed by the processing resource 206 of the PC 202, the diagnostic and/or erasure application 214 causes the processing resource 206 to perform the method 300. The method 300 begins at step 301 with the diagnostic and/or erasure application 214 temporarily modifying or temporarily over-riding the default endpoint configuration functionality of the OS 212. Thereafter, in response to the physical connection of any one of the mobile USB devices 4a, 4b and 4c to the PC 202 at step 302, the diagnostic and/or erasure application 214 reads a USB device descriptor from the mobile USB device 4a, 4b, 4c at step 304 and uses the USB device descriptor to select information relating to the mobile USB device 4a, 4b, 4c from accumulated information relating to a plurality of known mobile USB devices stored in the memory 208 of the PC 202 and/or to select information relating to the operation to be performed in relation to the mobile USB device 4a, 4b, 4c from the accumulated information relating to a plurality of known mobile USB devices stored in the memory 208 of the PC 202. At step 306, the diagnostic and/or erasure application 214 checks whether the mobile USB device 4a, 4b, 4c is supported i.e. the diagnostic and/or erasure application 214 checks whether information relating to the mobile USB device 4a, 4b, 4c and/or information relating to the operation to be performed in relation to the mobile USB device 4a, 4b, 4c is stored in the memory 208 of the PC 202. If it is determined at step 306 that the mobile USB device 4a, 4b, 4c is not supported, the method returns to step 302. If it is determined at step 306 that the mobile USB device 4a, 4b, 4c is supported, the method continues at step 308 with the diagnostic and/or erasure application 214 determining a required USB endpoint configuration that is required for performing an operation in relation to the USB device in the form of a minimal USB interface set required to perform the diagnostic and/or erasure operation in relation to the mobile USB device 4a, 4b, 4c. The diagnostic and/or erasure application 214 then configures the minimal USB interface set in the USB controller 210 at step 310 so as to open one or more pipes between the USB controller 210 and one or more corresponding USB endpoints of the mobile USB device 4a, 4b, 4c. Once the minimal USB interface set has been configured in the USB controller 210, the diagnostic and/or erasure application 214 causes the processing resource 206 to perform the diagnostic and/or erasure operation in relation to the mobile USB device 4a, 4b, 4c via the USB controller 210 at step 312. Once the diagnostic and/or erasure operation has been performed in relation to the mobile USB device 4a, 4b, 4c, the diagnostic and/or erasure application 214 causes the processing resource 206 to unconfigure the minimal USB interface set in the USB controller 210 so as to close the one or more pipes between the USB controller 210 and the one or more corresponding USB endpoints of the mobile USB device 4a, 4b, 4c at step 314. The method 300 continues at step 316 with the diagnostic and/or erasure application 214 checking if any more operations are to be performed in relation to the mobile USB device 4a, 4b, 4c. If more operations are to be performed in relation to the mobile USB device 4a, 4b, 4c, the method returns to step 308. If no more operations are to be performed in relation to the mobile USB device 4a, 4b, 4c, the method returns to step 302.

Use of the minimal USB interface set minimises the USB endpoint resources of the USB controller 210 which need to be reserved in order to perform the diagnostic and/or erasure operation in relation to the mobile USB device 4a, 4b, 4c via the USB controller 210. Consequently, use of the minimal USB interface set may allow operations to be performed concurrently in relation to a greater number of mobile USB devices than prior art methods and/or may allow operations to be performed concurrently in relation to the same number of mobile USB devices using fewer USB endpoint resources of the USB controller 210 and/or fewer USB controllers than prior art methods. Moreover, unconfiguring the minimal USB interface set in the USB controller 210 so as to close the one or more pipes between the USB controller 210 and the one or more corresponding USB endpoints of the mobile USB device 4a, 4b, 4c after the diagnostic and/or erasure operation has been performed in relation to the mobile USB device 4a, 4b, 4c via the USB controller 210, releases the USB endpoint resources of the USB controller 210 at the earliest possible opportunity without any requirement to physically disconnect the mobile USB device 4a, 4b, 4c from the USB controller 210. Accordingly, the method 300 may allow operations to be performed concurrently in relation to a greater number of mobile USB devices than prior art methods and/or may allow operations to be performed concurrently in relation to the same number of mobile USB devices using fewer USB endpoint resources of the USB controller 210 and/or fewer USB controllers than prior art methods.

As will be described in more detail below, in the method 300, the endpoint configuration is deferred until the diagnostic and/or erasure application 214 decides which specific interfaces of the mobile USB devices 4a, 4b, 4c to use. The actual implementation mechanism is based on a two-level USB authentication framework in the OS 212 of the PC 202, which provides access control at USB device level and also at USB interface level. The method 300 effectively binds the USB endpoint configuration and deconfiguration to the interface level authorization control.

The method 300 for use in performing the diagnostic and/or erasure operation in relation to one of the mobile USB devices 4a, 4b, 4c will now be described in the context of the handling flow of the OS 212 of the PC 202 with reference to FIG. 5. The method 300 begins in response to the physical connection of one of the mobile USB devices 4a, 4b and 4c to the USB controller 210. At step 402, the OS 212 of the PC 202 causes the USB controller 210 to establish a control pipe between the USB controller 210 and the mobile USB device 4a, 4b, 4c. At step 404, the OS 212 of the PC 202 generates a hot plug event to the diagnostic and/or erasure application 214. At step 406, the OS 212 of the PC 202 then checks whether or not a setting of "authorized by default" is set to "true". If the setting of "authorized by default" is set to "true", the OS 212 of the PC 202 configures a USB interface in the USB controller 210 at step 408 so as to open all of the pipes between the USB controller 210 and the corresponding endpoints of the mobile USB device 4a, 4b, 4c according to a default endpoint configuration for the mobile USB device 4a, 4b, 4c. If the setting of "authorized by default" is not set to "true", the OS 212 of the PC 202 waits at step 410 until an authorization is given by the diagnostic and/or erasure application 214 through some other authorization mechanism before proceeding to step 412. If the setting of "interfaces authorized by default" is set to "true" at step 412, the OS 212 of the PC 202 proceeds to step 408.

If proceeding to step 408 so as to open all of the pipes between the USB controller 210 and the corresponding endpoints of the mobile USB device 4a, 4b, 4c according to the default endpoint configuration for the mobile USB device 4a, 4b, 4c, the diagnostic and/or erasure application 214 then performs the desired diagnostic and/or erasure operation in relation to the mobile USB device 4a, 4b, 4c via the USB interface of the USB controller 210 when configured in the device default configuration.

Figure 4:
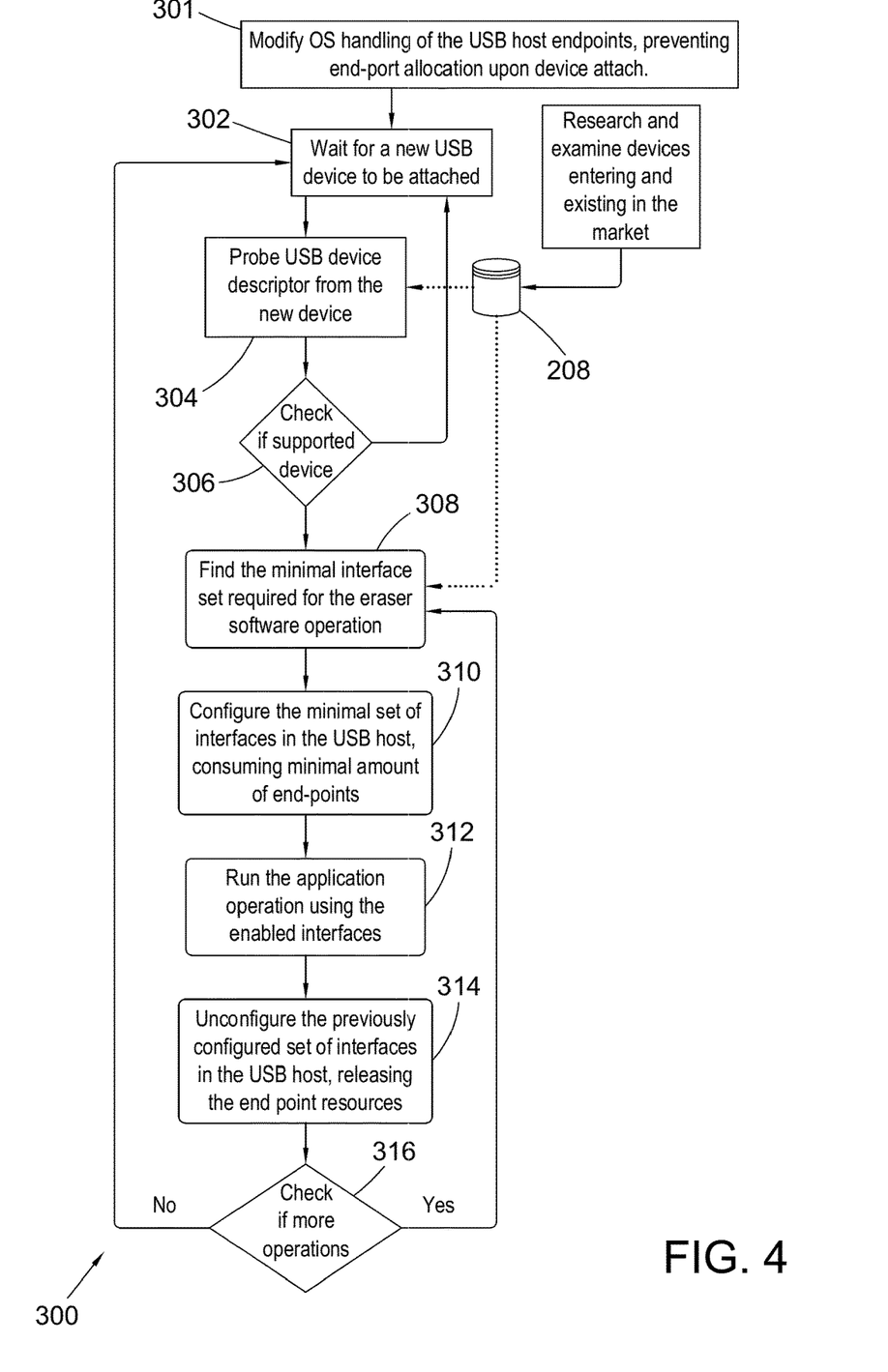
FIG. 4 schematically illustrates a method for performing an operation in relation to one of the USB devices shown in FIG. 3 using the apparatus shown in FIG. 3.

However, if a setting of "interfaces not authorized by default" is set to "true", the OS 212 of the PC 202 proceeds to step 420 wherein, upon receiving a USB interface authorization, the OS 212 of the PC 202 configures the USB endpoints of the mobile USB device 4a, 4b, 4c required according to the minimal USB interface set determined at step 308 of FIG. 4.

Furthermore, the OS 212 of the PC 202 updates a kernel authorization status of the USB controller 210 at step 422 thereby allowing the diagnostic and/or erasure application 214 to register and use one or more drivers of the USB controller 210 so that the diagnostic and/or erasure application 214 can perform the desired diagnostic and/or erasure operation in relation to the mobile USB device 4a, 4b, 4c via the configured USB interface of the USB controller 210 at step 424. The OS 212 of the PC 202 then updates the "USB interface authorized" setting to allow the diagnostic and/or erasure application 214 to unregister the one or more drivers for the USB controller 210 at step 426. The OS 212 of the PC 202 causes the USB controller 210 to unconfigure the USB endpoints of the mobile USB device 4a, 4b, 4c configured according to the minimal USB interface set so as to release the corresponding USB endpoint resources of the USB controller 210 at step 428. The kernel authorization status of the OS 212 of the PC 202 is then updated at step 430 so as to allow the diagnostic and/or erasure application 214 to unregister the one or more drivers for the USB controller 210 at step 430.

Figure 5:
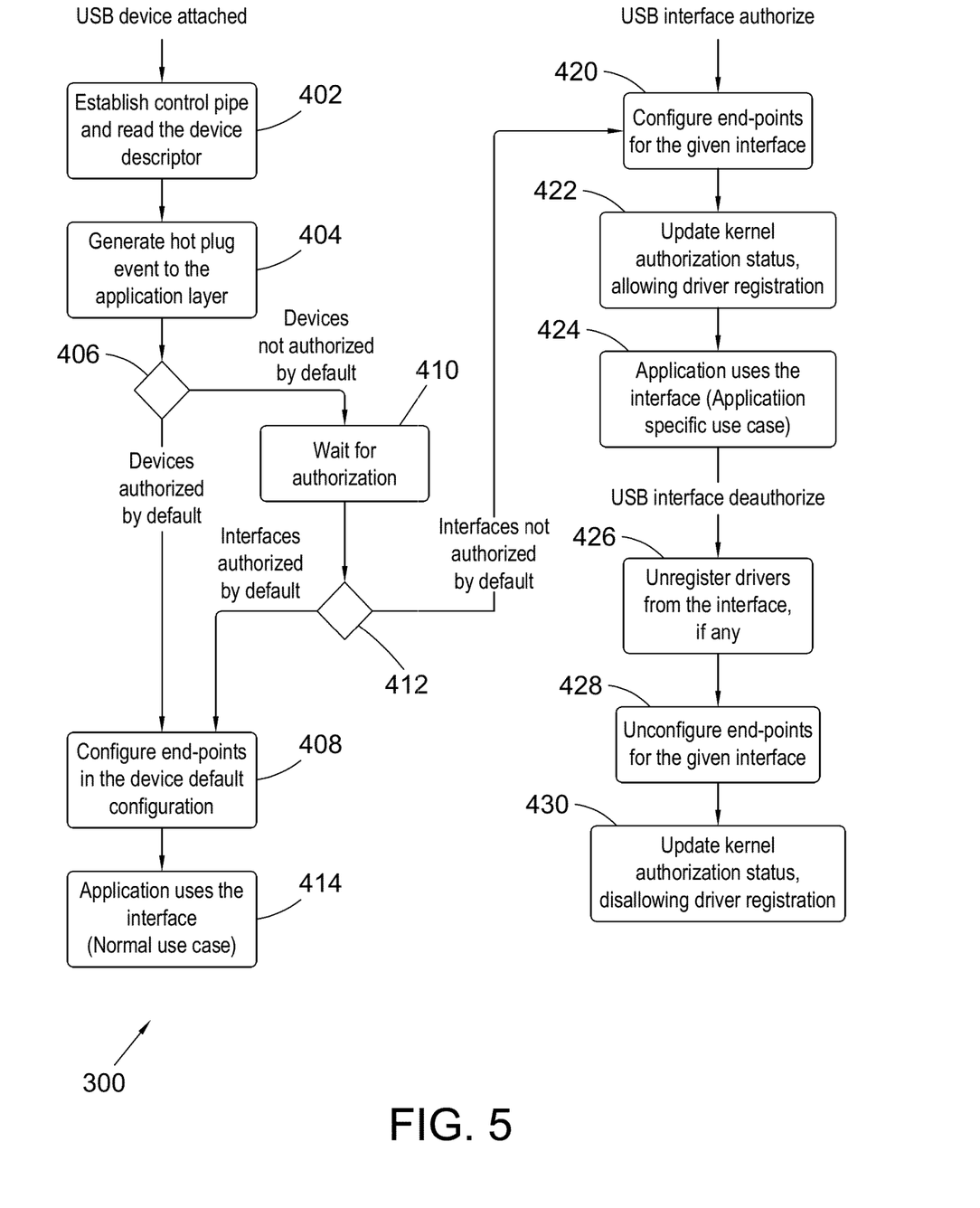
FIG. 5 schematically illustrates the method of FIG. 4 in the context of the handling flow of an OS of a computing resource of the apparatus shown in FIG. 3.

From the foregoing description of FIG. 5, one of ordinary skill in the art will understand that, for a setting of "interfaces not authorized by default" set to "true", the USB endpoints of the mobile USB device 4a, 4b, 4c are configured for the minimal USB interface set of the mobile USB device 4a, 4b, 4c at step 420, otherwise the USB endpoints of the mobile USB device 4a, 4b, 4c are configured according to the USB device default configuration at step 408. Furthermore, one of ordinary skill in the art will understand that the configured USB endpoints are unconfigured at step 428 after the diagnostic and/or erasure application 214 has been performed at step 424, thereby releasing the USB endpoint resources of the USB controller 210.

Figure 6A:
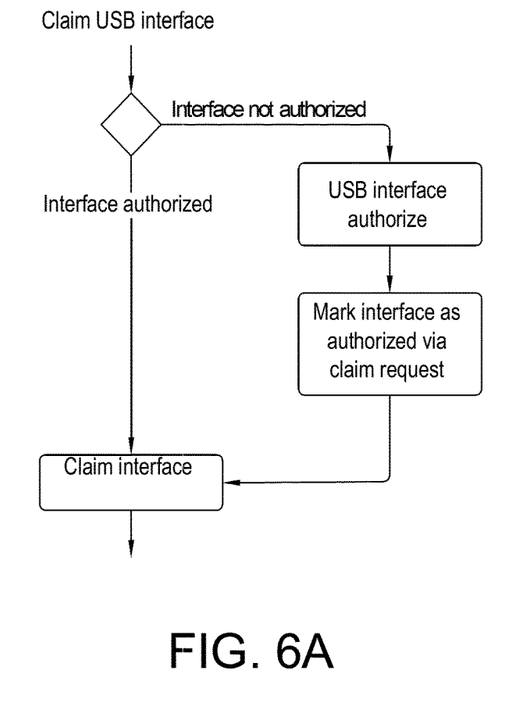
FIG. 6A schematically illustrates a USB interface claim operation associated with the method of FIG. 3.

FIG. 6A illustrates a USB interface claim operation implemented by the OS 212 of the PC 202 which adds a check step for use in combination with the method 300, wherein if a USB interface is currently unauthorized, then the USB interface is authorized and flagged as being authorized based on a claim request.

Figure 6B:
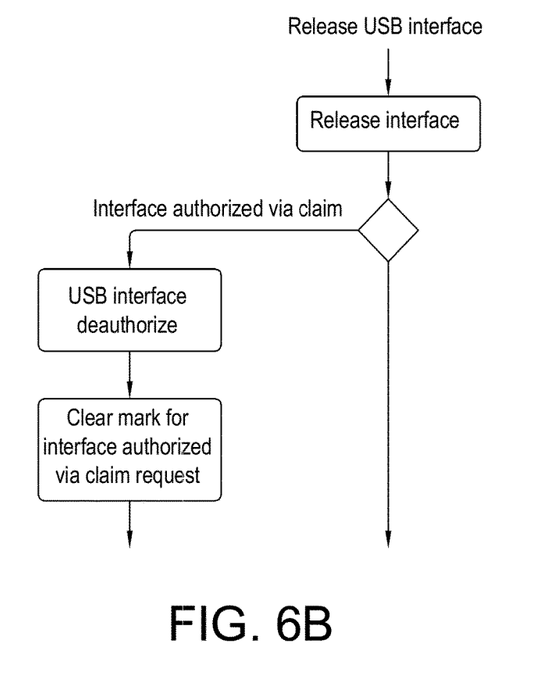
FIG. 6B schematically illustrates a USB interface release operation associated with the method of FIG. 3.

Conversely, FIG. 6B illustrates a USB interface release operation implemented by the embedded software 216 which adds a check step for use in combination with the method 300, wherein if a USB interface was authorized on claim request, then the USB interface is automatically de-authorized.

One of ordinary skill in the art will understand that the apparatus and methods described above may be modified without departing from the scope of the present invention as defined by the appended claims. For example, rather than selecting information relating to the mobile USB device 4a, 4b, 4c and/or information relating to the operation to be performed in relation to the mobile USB device 4a, 4b, 4c from the accumulated information relating to a plurality of known mobile USB devices stored in the memory 208 of the PC 202, the method may comprise selecting information relating to the mobile USB device 4a, 4b, 4c and/or information relating to the operation to be performed in relation to the mobile USB device 4a, 4b, 4c from accumulated information relating to a plurality of known mobile USB devices stored in a database such as a database located remotely from the PC 202.

In another variant of the method 300 described with reference to FIG. 4, between step 306 and step 308 the diagnostic and/or erasure application 214 may request, from a user, information relating to the mobile USB device 4a, 4b, 4c and/or information relating to the operation to be performed in relation to the USB device 4a, 4b, 4c via the user interface 209 of the PC 202. For example, the diagnostic and/or erasure application 214 may request that the user selects a diagnostic and/or erasure operation to be performed in relation to the USB device 4a, 4b, 4c. Once the user inputs the information relating to the mobile USB device 4a, 4b, 4c and/or information relating to the operation to be performed in relation to the USB device 4a, 4b, 4c via the user interface 209, the diagnostic and/or erasure application 214 may then determine the required USB endpoint configuration that is required for performing the operation in relation to the USB device 4a, 4b, 4c in the form of a minimal USB interface set required to perform the diagnostic and/or erasure operation in relation to the mobile USB device 4a, 4b, 4c based at least in part on the information provided by the user.

One of ordinary skill in the art will also understand that, depending on the implementation, some of the steps of the methods illustrated in FIGS. 5, 6A and 6B which are defined by the OS 212 of the PC 202, may be defined by the diagnostic and/or erasure application 214. Conversely, some of the steps of the methods illustrated in FIGS. 5, 6A and 6B which are defined by the diagnostic and/or erasure application 214, may be defined by the OS 212 of the PC 202.

One of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above

The invention claimed is:

1. An apparatus for performing an operation in relation to a USB device, the apparatus comprising:
   a USB controller configured for communication with a computing resource, the computing resource including a processing resource and a memory, wherein the memory stores an operating system (OS) and a computer program which is configured to run on top of the OS, and wherein, when executed by the processing resource, the computer program causes the processing resource to perform the steps comprising:
   configuring a USB interface in at the USB controller so as to open one or more pipes between the USB controller and one or more corresponding USB endpoints of a USB device according to a required USB endpoint configuration of the USB device that is required for performing an operation in relation to the USB device;
   performing the operation in relation to the USB device;
   unconfiguring the configured USB interface, while maintaining a connection to the USB device, in the USB controller so as to close the one or more pipes between the USB controller and the one or more corresponding USB endpoints of the USB device, reading, from the USB device, a USB device descriptor; and
   using the USB device descriptor to select the information relating to the USB device and/or the information relating to the operation to be performed in relation to the USB device from accumulated information relating to a plurality of known USB devices stored in the memory of the computing resource or from a database such as a database located remotely from the computing resource.

2. The apparatus of claim 1, wherein the computer program further causes the processing resource to configure the USB interface in the USB controller so as to open one or more pipes between the USB controller and the USB device in response to communication between the USB device and the USB controller, for example in response to detecting the attachment or connection of the USB device to the USB controller.

3. The apparatus of claim 1, wherein the computer program further causes the processing resource to receive information relating to the USB device and/or receiving information relating to the operation to be performed in relation to the USB device.

4. The apparatus of claim 3, wherein the computer program further causes the processing resource to determine the required endpoint configuration of the USB device based at least in part on the received information relating to the USB device and/or the received information relating to the operation to be performed in relation to the USB device.

5. The apparatus of claim 4, wherein the required endpoint configuration of the USB device comprises the minimum number of USB endpoints of the USB device required to perform the operation in relation to the USB device.

6. The apparatus of claim 5, wherein the computer program further causes the processing resource to determine the minimum number of USB endpoints of the USB device required to perform the operation in relation to the USB device based at least in part on the received information relating to the USB device and/or the received information relating to the operation to be performed in relation to the USB device.

7. The apparatus of claim 1, wherein the USB controller is connected to the computing resource.

8. The apparatus of claim 1, wherein the computer program comprises dedicated software or an application.

9. The apparatus of claim 1, wherein, when executed by the processing resource, the computer program causes the processing resource to modify or over-ride the default USB endpoint configuration functionality of the OS and configure the USB interface in the USB controller so as to open the one or more pipes between the USB controller and one or more corresponding USB endpoints of the USB device according to the required USB endpoint configuration of the USB device that is required for performing the operation in relation to the USB device.

10. The apparatus of claim 9, wherein, when executed by the processing resource, the computer program causes the processing resource to modify or over-ride the default USB endpoint unconfiguration functionality of the OS and to unconfigure the configured USB interface in the USB controller so as to close the one or more pipes between the USB controller and the one or more corresponding USB endpoints of the USB device.

11. The apparatus of claim 1, wherein the OS of the computing resource comprises a Linux OS.

12. The apparatus of claim 11, wherein the computer program further causes the processing resource to modify or override the default USB endpoint configuration functionality and/or the default USB endpoint unconfiguration functionality defined by at least a portion of a kernel of the Linux OS of the computing resource.

13. The apparatus of claim 1, wherein the computer program further causes the processing resource to select appropriate parameters of the OS so as to modify or over-ride the default USB endpoint configuration functionality and/or the default USB endpoint unconfiguration functionality of the OS.

14. The apparatus of claim 1, wherein, when executed by the processing resource, the computer program causes the processing resource to request from a user, information relating to the USB device and/or information relating to the operation to be performed in relation to the USB device via a user interface of the computing resource.

15. The apparatus of claim 1, wherein the operation comprises an erasure operation.

16. The apparatus of claim 15, wherein performing the erasure operation comprises over-writing data stored in a memory of the USB device and/or causing the USB device to execute an erasure operation defined by the USB device.

17. The apparatus of claim 1, wherein the operation comprises a diagnostic operation.

18. The apparatus of claim 17, wherein performing the diagnostic operation comprises performing the diagnostic operation to the USB device and/or causing the USB device to execute a diagnostic operation defined by the USB device.

19. The apparatus of claim 1, wherein the computer program further causes the processing resource to:
configure one or more USB interfaces in a USB controller so as to open one or more pipes between the USB controller and one or more corresponding USB endpoints of a plurality of USB devices according to a corresponding plurality of required USB endpoint configurations of the plurality of USB devices, wherein the required USB endpoint configuration of any given USB device is the USB endpoint configuration required for performing a corresponding operation in relation to the given USB device;
perform the corresponding operation in relation to each one of the plurality of USB devices; and
unconfigure the one or more configured USB interfaces in the USB controller so as to close the one or more pipes between the USB controller and the one or more corresponding USB endpoints of the plurality of USB devices.

20. The apparatus of claim 1, wherein each USB device comprises a mobile USB device including at least one of a mobile phone, a cell phone, a smart phone, a tablet, and a laptop.

* * * * *